United States Patent [19]
Shinjo

[11] 3,851,373
[45] Dec. 3, 1974

[54] METHOD AND APPARATUS FOR ATTACHMENT OF A NUT IN THE INSIDE WALL OF A PIPE

[76] Inventor: Katsumi Shinjo, 8,6-chome, Asahiminamidoori, Nishinariku, Osaka, Japan

[22] Filed: Sept. 6, 1973

[21] Appl. No.: 394,663

[52] U.S. Cl. ............ 29/432.2, 29/200 B, 29/243.55, 151/41.73
[51] Int. Cl. .................... B23p 19/00, B23p 11/00
[58] Field of Search .. 29/432.2, 432, 200 B, 243.55; 151/41.73, 41.72, 41,.71

[56] References Cited
UNITED STATES PATENTS

| 521,825 | 6/1894 | Shipe | 29/432 |
| 1,748,045 | 2/1930 | Jones | 29/243.55 |
| 2,426,106 | 8/1947 | Kinley | 29/432 UX |
| 2,646,567 | 7/1953 | Sloan | 29/432.2 |
| 2,652,942 | 9/1953 | Muchy | 29/432.2 UX |
| 2,707,322 | 5/1955 | Strain et al. | 29/432 |
| 2,749,606 | 6/1956 | Donahue | 29/432 |
| 3,028,037 | 4/1962 | Deaton | 29/200 B |
| 3,185,268 | 5/1965 | Heine | 29/432 X |

FOREIGN PATENTS OR APPLICATIONS

| 395,771 | 5/1924 | Germany | 29/243.55 |

*Primary Examiner*—Charlie T. Moon
*Attorney, Agent, or Firm*—Craig & Antonelli

[57] ABSTRACT

Method and apparatus for attaching a nut in the inside wall of a pipe by enabling the nut to punch its own installation aperture therein and swaging the metal of the pipe around the aperture into the grooves of the nut, thereby ensuring the anchorage of the nut in the wall of the pipe. The nut is held inside the pipe and is driven against the wall of the pipe under outward pressure effected inside the pipe, thereby enabling the nut to pierce the wall of the pipe against a die engageable with that portion of the outside wall of the pipe at which the nut is to be attached. The die has swaging blades in the tip thereof so as to swage the metal around the punched aperture into the grooves of the nut for anchorage thereof.

31 Claims, 11 Drawing Figures

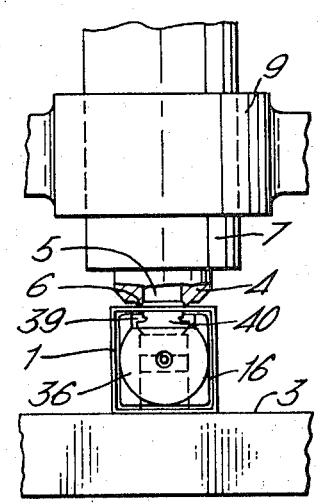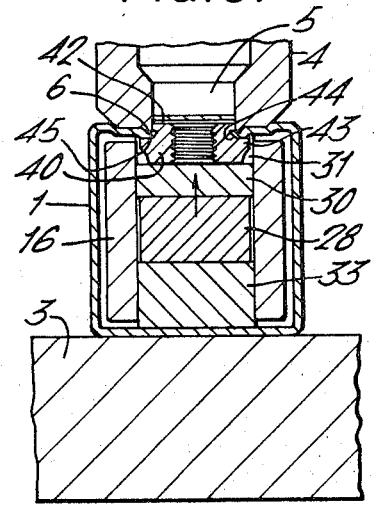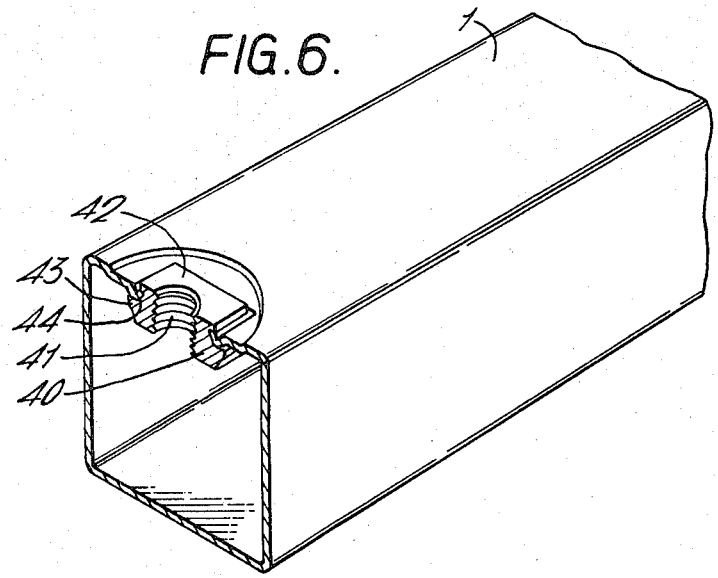

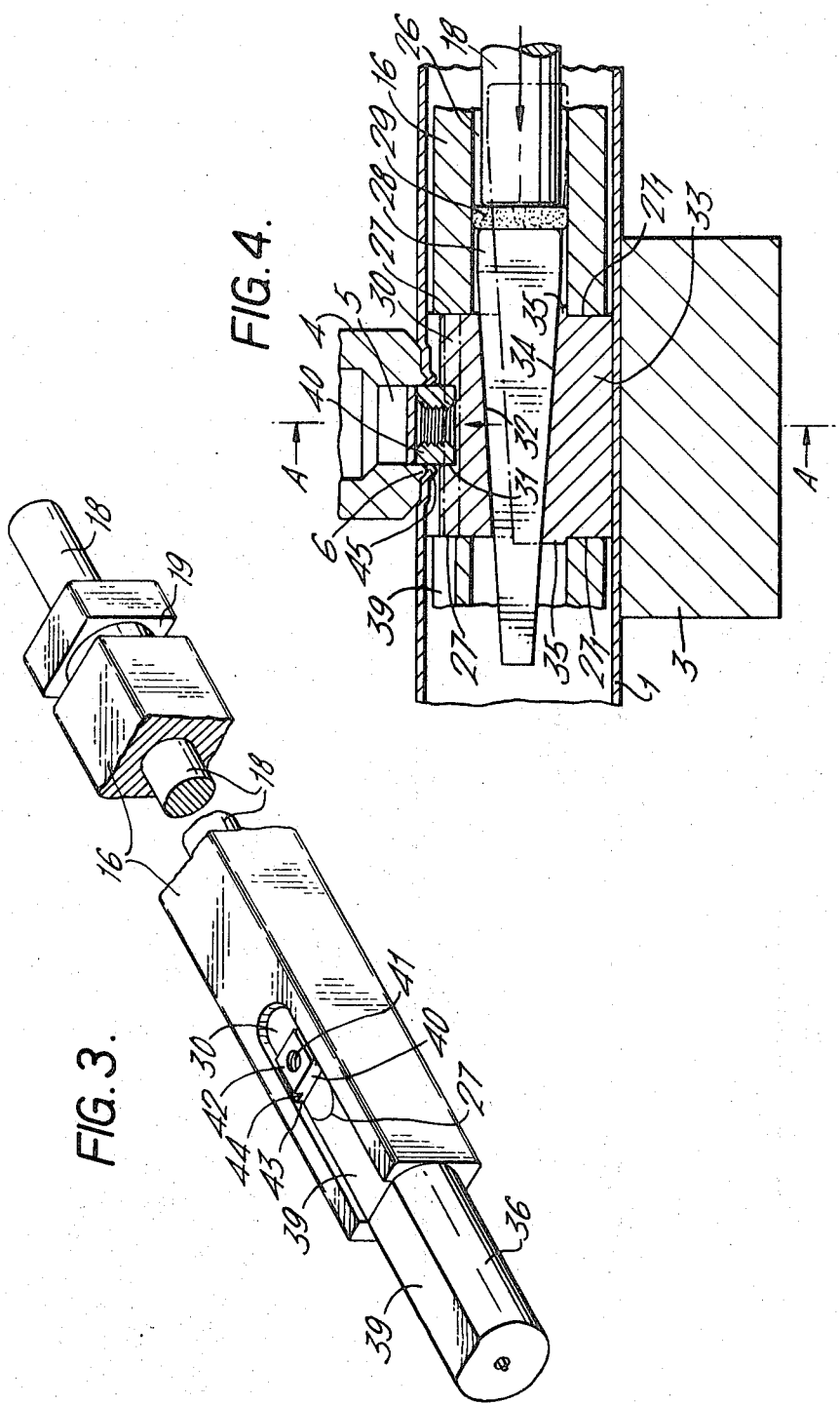

3,851,373

METHOD AND APPARATUS FOR ATTACHMENT OF A NUT IN THE INSIDE WALL OF A PIPE

BACKGROUND AND SUMMARY OF THE INVENTION

This invention relates to a method and apparatus of attaching a nut in the inside wall of a hollow pipe, particularly square or four-cornered pipe. More specifically, the invention is concerned with the attachment of a nut from the inside to the wall of a hollow pipe, especially four-cornered pipe, wherein the nut punches its own installation aperture in the wall of the pipe, and wherein the metal of the pipe around the aperture is swaged into the grooves of the nut, thereby ensuring the anchorage of the nut in the wall of the pipe.

A self-piercing nut or pierce nut, commonly so called, is already known and is in wide use for attaching the same in a metal panel under pressure, wherein the nut punches its own installation aperture in the panel, around which aperture the metal of the panel is swaged into the grooves of the nut, thereby enabling the nut to anchor in the panel. A nut of this type is particularly described, for example, in U.S. Pat. Nos. 2,707,322 and 3,152,628. A further piercing nut is described in my copending U.S. application, Ser. No. 325,049, filed Jan. 19, 1973, which can be used with the present invention.

However, such piercing nuts cannot be applied or attached to a hollow pipe using previously contemplated methods and apparatus, since a hollow pipe is generally enclosed unlike a metal panel, so that difficulties arise when driving a nut into the inside walls of the pipe under pressure. The present invention is directed to overcoming the difficulties pointed out above.

The present invention contemplates providing novel methods and apparatus for attaching a piercing nut in the inside wall of a hollow pipe. Using the apparatus and methods of the present invention, nut fastening from the inside of hollow pipes is advantageously accomplished in an economical and reliable manner.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is a side view of the apparatus illustrated in FIG. 1, viewed from the left-hand side thereof;

FIG. 3 is a perspective view showing a nut carrying device of the apparatus illustrated in FIG. 1;

FIG. 4 is a vertical cross-sectional view of the device illustrated in FIG. 3 which shows the condition thereof in operation;

FIG. 5 is a vertical cross-section of the device illustrated in FIG. 4, taken along the line A—A;

FIG. 6 is a perspective view showing the assembly of a nut and a square pipe, being partly broken away to show the attachment therebetween;

DETAILED DESCRIPTION OF THE DRAWINGS

Figure 7:
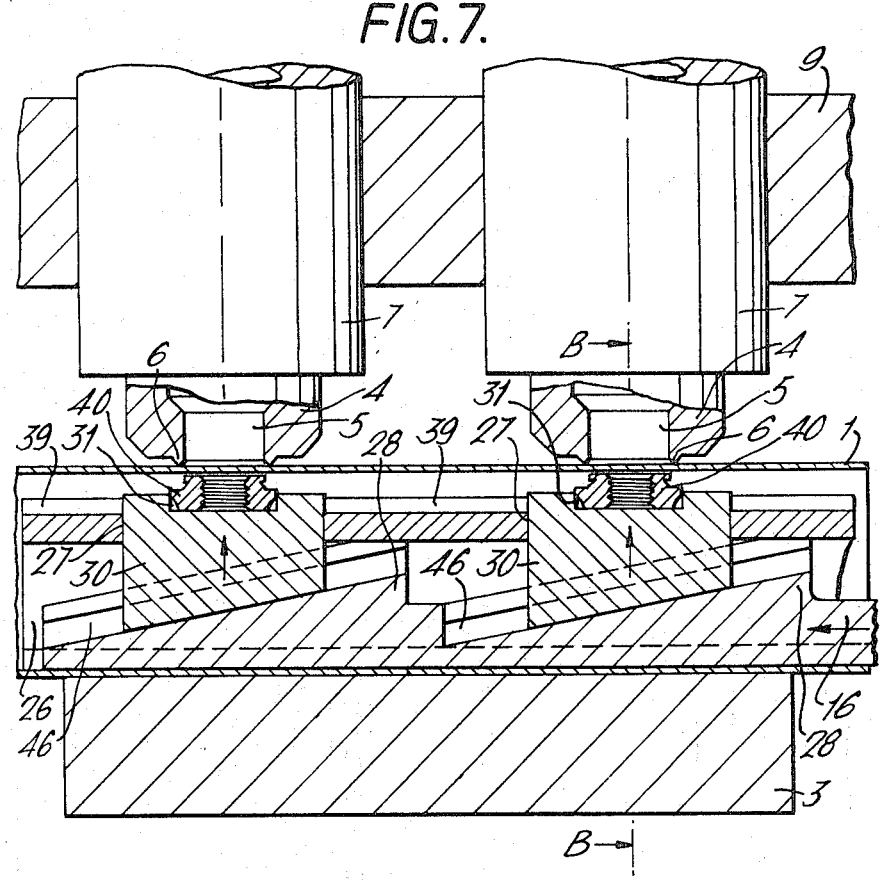
FIG. 7 is a vertical cross-sectional view of an apparatus constructed and arranged according to a second preferred embodiment of the present invention.

In this specification, a nut means a self-piercing nut or a pierce nut, which, with reference to FIGS. 6 and 7, is described as follows. The nut 40 has a pilot portion 42 around a threaded opening 41 functioning as a punch against a metallic material, and has flanges 43 extending outwardly from the opposite sides of the pilot portion 42, which flanges are to support the metallic material thereon when the nut is anchored therein. In addition, the nut has grooves 44 undercut between the pilot portion 42 and the flanges 43.

The pilot portion 42 is normally of rectangular shape whose four edges work as punching blades. When the pilot portion 42 punches a nut installation aperture in the metallic material, the metal around the aperture is swaged into the grooves 44 in the sides of the nut 40, whereby the nut is securely attached in the material with additional support by the flanges 43. The above-mentioned U.S. Pat. Nos. 2,707,322 and 3,152,628 include further detailed descriptions of piercing nuts that could be used with the present invention. Also, the nut of my above-mentioned copending application could be used with the present invention.

Figure 1:
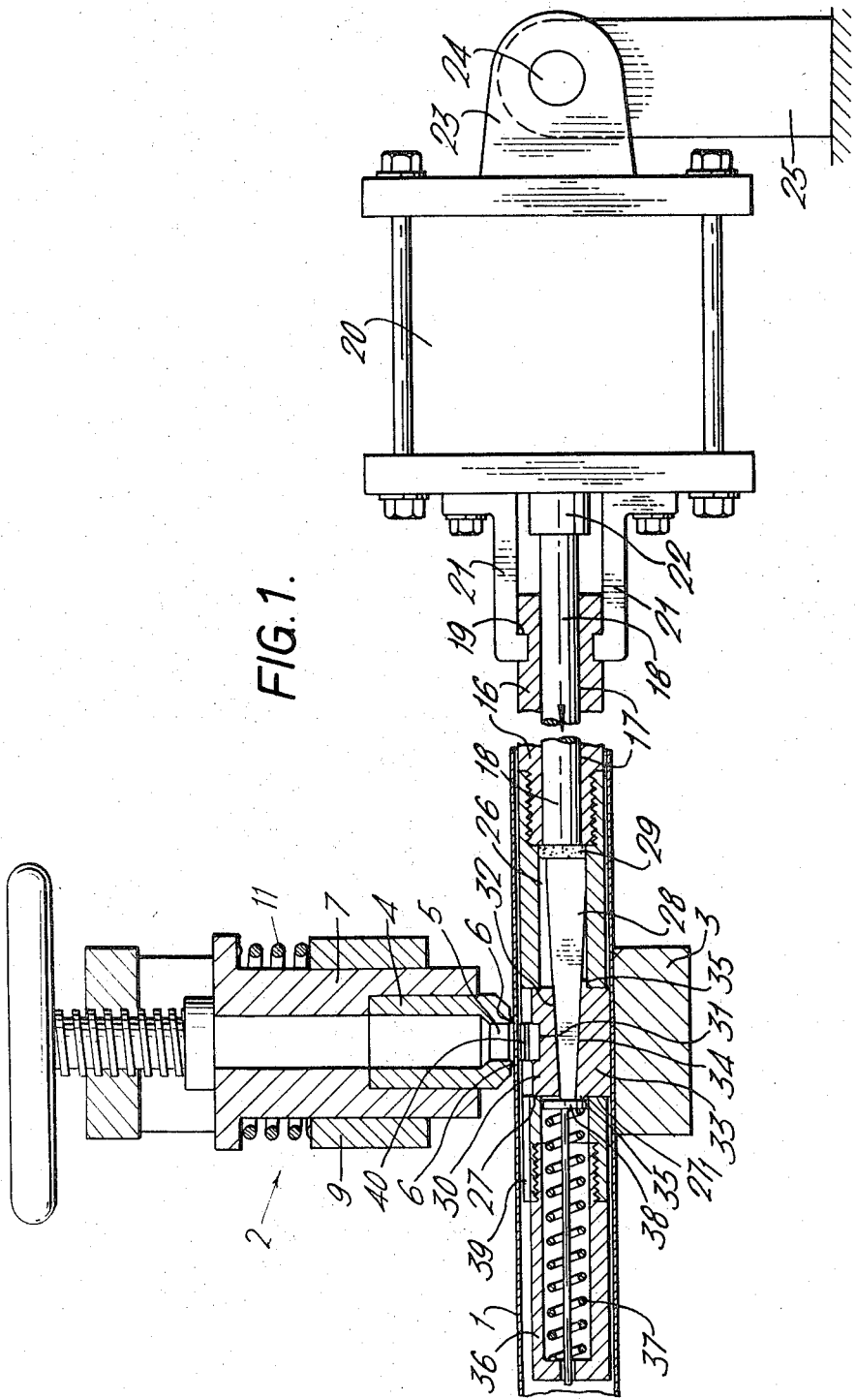
FIG. 1 is a vertical cross-sectional view showing the main parts of an apparatus constructed and arranged according to a first preferred embodiment of the present invention.

Referring now to FIG. 1, in which a first embodiment is illustrated, a pipe 1 (in this case, a square pipe) is placed on a supporting block or worktable 3 of a clamping unit 2. At opposite position to the worktable 3, there is a die 4 with a bore 5 open in the top end thereof, in which a nut installation aperture is punched against the pilot portion 42 of the nut 40, as will be hereinafter described. The opening of the bore 5 is surrounded with swaging blades 6 projecting downwardly. The die 4 is held by a die holder 7, which is slidably held by frame 9. When the die holder 7 is lowered as under pressure, the die 4 comes in tight contact with the outside surface of the pipe 1. Thus, the pipe 1 is effectively clamped in the clamping unit 2, in which the punching operation is to be carried out, as will be hereinafter described.

In the pipe 1, there is an inserter 16 of square shape, similar to the section of the pipe 1, thereby enabling the inserter to be positioned and orientated adequately when inserted with the outer surfaces of the inserter 16 being guided by inner surfaces of the pipe 1. The inserter 16 is long enough to reach the place at which the nut 40 is attached in the inside wall of the pipe 1, and in addition, it has a bore 17 produced axially thereof, in which a pressing rod 18 is slidably housed so as to be driven by an air pressure device 20. The inserter 16 is fastened to the air pressure device 20 by means of a braket 21 whose bended portion engages in the groove 19 of the inserter 16. The pressing rod 18 is cooperably connected to a piston rod 22 of the air pressure device 20, thereby enabling the pressing rod 18 to reciprocate axially in the inserter.

The air pressure device 20 has its tail portion 23 pivotally supported by a supporting post 25 through a pivot 24, whereby the inserter 16 is enabled to swing about the pivot 24 as a whole with the air pressure device 20. This will be of particular advantage when the inserter 16 is inserted into or removed out of the pipe 1.

As best illustrated in FIG. 4, the top portion of the inserter 16 is provided with a space 26 with which the bore 17 is open so as to be in communication therewith. In addition, the space 26 is passed through by a pair of elongated slots 27 and $27_1$. Within the space 26, there is a wedge 28 to be pushed by the pressing rod 18 through a cushion 29. A nut holding block or nut holder 30 is slidably fitted in the elongated slot 27, provided with a nut seat 31 in the top surface thereof and a slant surface 32 at the bottom thereof so as to match the tapered wedge 28. The nut holder 30 is movable substantially at right angles to the longitudinal axis of the inserter 16. In the elongated slot $27_1$, a counterpart block 33 is tightly fitted, provided with a slant top surface 34 matching the tapered wedge 28. The counterpart block 33 has shoulders 35 so as to prevent the same from being detrimentally lowered when pressure exerts thereupon as the wedge is driven. Normally, the wedge 28 is thus insertedly held between the nut holder 30 and the counterpart block 33. The bottom portion of the counterpart block 33 is extruded outside the elongated slot $27_1$, such that it comes into contact with the inside wall surface of the pipe 1. Therefore, by replacing the counterpart block 33 in accordance with varying sizes of the pipe 1, and controlling the extruded amount of the counterpart block 33 (downwardly depending portion from inserter 16 as seen in FIG. 4), the position of the nut holder 30 can be adequately adjusted with respect to the inside wall of the pipe.

The inserter 16 is connected to a sleeve 36 in which a coiled spring 37 is effectively housed, as best illustrated in FIG. 1. The coiled spring 37 normally urges a pusher 38 to engage with the wedge 28, thereby enabling the wedge to take its regular position after the latter has been driven by the pressing rod 18. As illustrated in FIG. 3, both the inserter 16 and the sleeve 36 have portions 39 cut away, respectively, so as to allow the inserter 16 to pass through the pipe 1 after the nut 40 has been fastened in the inside wall of the pipe, wherein, by virtue of the vacancy of the portion 39, the nut 40 can stand clear from the inserter 16 being removed.

With the apparatus thus described, the nut is attached in the inside wall of a pipe in the following manner:

Initially, the nut 40 is positioned in the nut seat 31 of the nut holder 30, and then the inserter 16 is inserted into the pipe 1 until the nut is substantially located face to face with that portion of the inside wall of the nut at which the nut is to be attached.

Subsequently, the pipe 1 is placed on the supporting block 3 of the clamping unit 2, and as illustrated in FIGS. 1 and 2, the die 4 is located at opposite position to the nut 40 seated in the nut seat 31. The die 4 is lowered by way of hydraulic pressure piston-cylinder means (not shown) until the die slightly contacts or compresses the outside wall of the pipe 1, whereby the pipe 1 is securely clamped between the die 4 and the supporting block 3.

The air pressure device 20 is then energized to drive the pressing rod 18 in the direction indicated by the arrow in FIG. 1, so as to enforce the wedge to pass through the narrow gap produced by the nut holder 30 and the counterpart block 33. Thus, the nut holder 30 is compelled to rise upwardly substantially at right angle to the axis of the pipe 1. The force raising the nut holder 30 is intensified under wedging effect as compared with the force impelling the wedge by the pressing rod 18. Consequently, the pilot portion 42 of the nut 40 is finally enforced to pierce the wall of the pipe against the die 4, with additional advantage that the swaging blades 6 of the die 4 swage the metal of the pipe around a punched aperture 45 into the grooves 44 of the nut, thereby enabling the nut to anchor in the wall of the pipe 1. A punched waste is released in the bore 5 of the die 4 as shown in FIG. 4.

When the application of pressure upon the die 4 is stopped, the die will rise up under the influence of a spring 11 together with the die holder 7. Hence, the pipe 1 is set free from the clamping of the die and the supporting block. On the other hand, the air pressure device 20 is deenergized, thereby causing the piston rod 22 and the pressing rod 18 equally to retreat, which enables the wedge 28 to return its original position under the urge of the coiled spring 37. When the wedge 28 is positioned backwards, the nut holder 30 lowers to its original position by gravity. The operation is finished by removing the inserter 16 out of the pipe 1.

Figure 8:
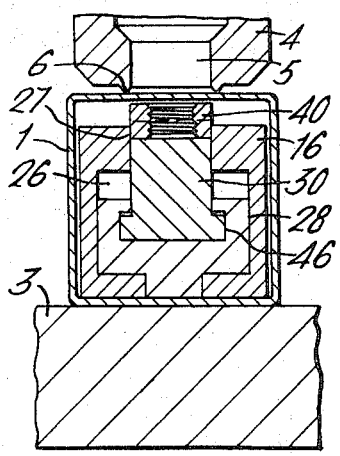
FIG. 8 is a vertical cross-sectional view of the apparatus illustrated in FIG. 7, taken along the line B—B.

In the apparatus illustrated in FIGS. 7 and 8, the inserter 16 is provided with two nut holders 30 located at a given spacing from one another, so as to attach two nuts 40 simultaneously in the inside wall of the pipe. A wedge 28 is of two-stage type as illustrated in FIG. 7, and the slant bottom surfaces 32 of the nut holders 30 are engaged respectively in the grooves 46 produced alongside the inclined surfaces of the wedge 28. The bottom of the wedge 28 is a flat plane slidable on the inside wall of the pipe 1 when inserted therein. When the wedge 28 is driven in the axial direction, the two nut holders 30 are respectively raised as indicated by arrows. The attachment of the nuts is performed in substantially the same manner as described above for the embodiment of FIG. 1.

Figure 9:
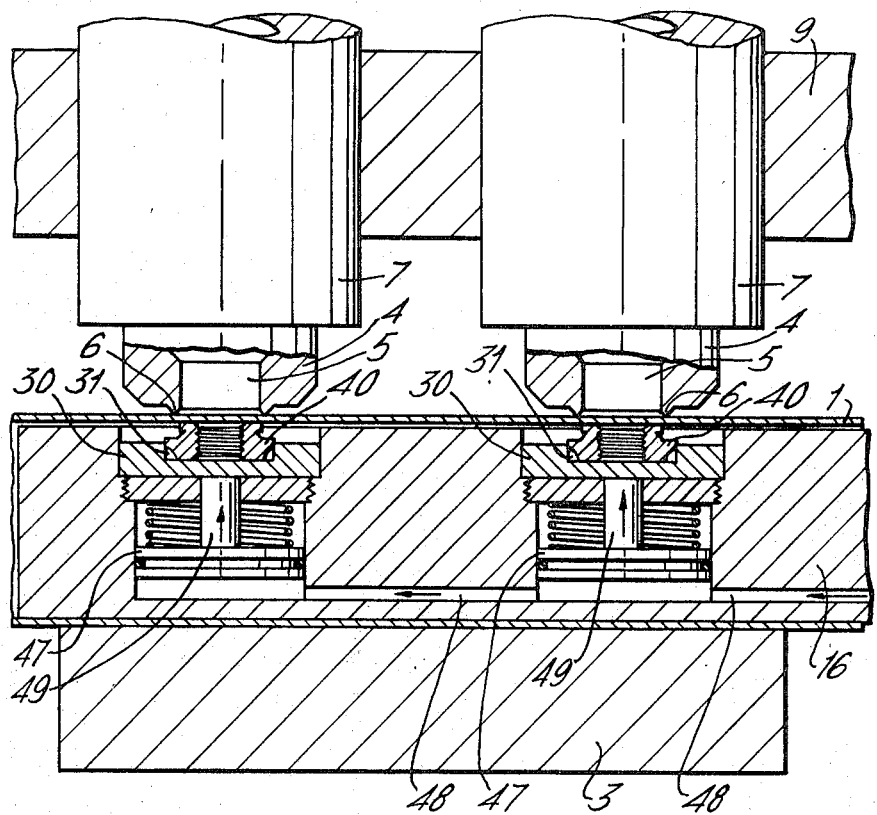
FIG. 9 is a vertical cross-sectional view of an apparatus constructed and arranged according to a third preferred embodiment of the present invention.

In the apparatus illustrated in FIG. 9, hydraulic pressure devices or hydraulic cylinders 47 are used instead of a wedge as illustrated hereinbefore. In the example illustrated, two cylinders are provided in the top portion of the inserter 16. Each hydraulic cylinder 47 is supplied with liquid through a passage 48, and has its piston rod 49 connected to a nut holder 30, thereby enabling the latter to rise upwardly substantially at right angle to the axis of the pipe 1 when hydraulic pressure is effected upon the piston rod 49. The nut 40 is attached in the same manner as described with reference to the first example. In this way, a plurality of nuts are simultaneously fastened in the inside wall of the pipe. Hydraulic pressure devices could also be used according to the present invention in arrangements with one or more than two nut holders.

Figure 11:
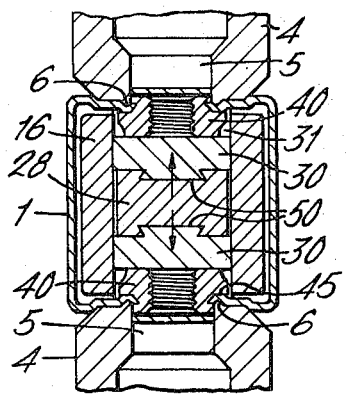
FIG. 11 is a vertical cross-sectional view of the apparatus illustrated in FIG. 10, taken along the line C—C.
Figure 10:
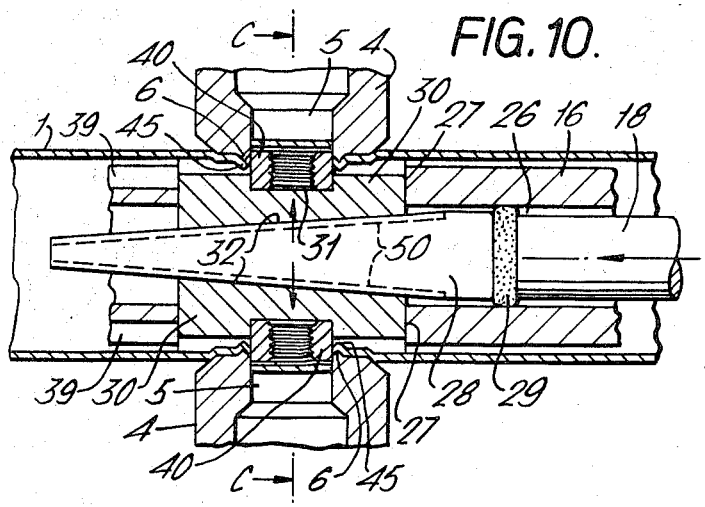
FIG. 10 is a vertical cross-sectional view of an apparatus constructed and arranged according to a fourth preferred embodiment of the present invention.

In the apparatus illustrated in FIGS. 10 and 11, a pair of nut holders 30 are provided at opposite sides of the pipe 1, so as to attach nuts in the respective opposite inside walls thereof. In such cases, the die 4 of one unit serves as a supporting block for the other unit, and vice versa, which eliminates the necessity to use an extra supporting block or worktable. The pipe 1 is effectively clamped between the upper and lower dies 4. The slant bottom surfaces 32 of the nut holders 30 are slidably supported in the grooves 50 cut in the tapering surfaces of the wedge 28, as in the example illustrated in FIGS. 7 and 8.

As has been stated hereinbefore, according to the present invention, a nut to be attached in a pipe is initially positioned therein as it is seated on an inserter, and then the nut is pressed against the inner wall of the pipe by means of a pressing device housed in the top portion of the pipe. In this situation, a die is lowered as under pressure, and the nut is enabled to punch its own installation aperture in cooperation with the die, whose swaging blades swage the metal around the aperture into the grooves of the nut so as to enable the same to anchor therein. Accordingly, the present invention makes it feasible to attach a nut in the inside wall of an elongated pipe, cylindrical or rectangular, and also, to attach a plurality of nuts simultaneously inside the pipe. Once the pipe is thus provided with nuts, other fastening operations of the pipe and attached nuts can be easily carried out outside the pipe.

As is evident from the foregoing, no extra tools are required to prefabricate a nut installation aperture in the wall of a pipe, and to anchor a nut therein, but a nut per se can perform these functions, thereby resulting in increased speed and efficiency, and in reduced cost for attaching nuts in a pipe.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. Apparatus for attaching a nut to a wall of a pipe; said apparatus comprising:
    a die having swaging blade means,
    die moving means for moving said die to and from a die operating position immediately adjacent and in facing relationship to an outside surface portion of a wall of a pipe,
    nut holder means for holding a nut,
    nut holder moving means for moving said nut holder means to and from a nut holder operating position inside of said pipe in facing relationship to an inside surface portion of said wall of said pipe which is directly opposite said die operating position,
    and pressing means for pressing said nut holder means in an outward direction transverse to the surface of said wall with sufficient pressure that a nut in said nut holder means punches its own installation aperture in the wall with said die providing a backing force for said nut and with said swaging blade means effecting a swaging of material of said wall around said aperture into grooves provided on said nut for anchoring said nut in said wall.

2. Apparatus according to claim 1, wherein said die has a bore in the center thereof, wherein said swaging blade means extend around said bore, and wherein said bore is dimensioned so as to accept the punched waste material from said wall which is punched by said nut during formation of said installation aperture.

3. Apparatus according to claim 1, wherein said nut holder moving means includes an inserter which is movable into and out of said pipe through an open end of said pipe.

4. Apparatus according to claim 3, wherein said pressing means includes: a wedge member extending in the longitudinal direction of said pipe when said inserter is positioned inside of said pipe, said wedge member having an inclined lateral surface portion in sliding engagement with a nut holder block forming said nut holder means,
    and wedge member moving means for forcibly moving said wedge member in said longitudinal direction with a resultant movement of said nut holder block in a direction at right angles to said longitudinal direction.

5. Apparatus according to claim 4, wherein said pressing means further includes return spring means for returning said wedge member in a direction opposite the direction of movement of said wedge member moving means.

6. Apparatus according to claim 4, wherein said wedge member moving means includes pressurized fluid operated piston-cylinder means.

7. Apparatus according to claim 6, wherein said pressurized fluid operated piston-cylinder means is a compressed air driven piston-cylinder arrangement.

8. Apparatus according to claim 3, wherein said inserter includes a reduced size portion at the side thereof which accommodates said nut holder, said reduced size portion extending from said nut holder to the end of said inserter opposite said open end of said pipe for accommodating withdrawal of said inserter without engagement with a nut anchored in said pipe wall.

9. Apparatus according to claim 1, wherein said die moving means includes hydraulically operated piston-cylinder means.

10. Apparatus according to claim 7, wherein said die moving means includes hydraulically operated piston-cylinder means.

11. Apparatus according to claim 1, comprising a further die with swaging blade means and further die moving means for moving said further die to and from a further die operating position immediately adjacent and in facing relationship to an outside surface portion of said wall which is spaced axially from said first-mentioned die, wherein said nut holder moving means includes a further nut holder means for accommodating a further nut and for moving said further nut to and from a position inside said pipe in facing relationship to said further die operating position.

12. Apparatus according to claim 11, wherein said nut holder moving means includes an inserter which is movable into and out of said pipe through an open end of said pipe, and wherein said pressing means includes: a wedge member extending in the longitudinal direction of said pipe when said inserter is positioned inside of said pipe, said wedge member having respective inclined lateral surface portions in sliding engagement with respective nut holder blocks of said nut holder means,
    and wedge member moving means for forcibly moving said wedge member in said longitudinal direction with a resultant simultaneous movement of both of said nut holder blocks in directions at right angles to said longitudinal direction.

13. Apparatus according to claim 12, wherein the respective nut holder blocks are on the same lateral side of said wedge member.

14. Apparatus according to claim 12, wherein the respective nut holder blocks are on opposite sides of said wedge member and in alignment with one another.

15. Apparatus according to claim 1, further comprising pipe back-up means positionable at the opposite side of said pipe as the die operating position for applying back-up forces for the nut anchoring operation.

16. Apparatus according to claim 15, wherein said back-up means is a fixed worktable surface.

17. Apparatus according to claim 15, wherein said back-up means is another die in facing relationship to said first-mentioned die.

18. Apparatus according to claim 11, wherein said nut holder moving means includes an inserter which is movable into and out of said pipe through an open end of said pipe, and wherein said pressing means includes a separate fluid pressure operated piston-cylinder arrangement for each of said nut holder means, said piston-cylinder arrangements being supported by said inserter and being operative to force said nut holder means in a direction at right angles to the longitudinal axis of said inserter and said pipe.

19. Apparatus according to claim 1, wherein said pressing means includes fluid operated piston-cylinder means for pressing said nut holder means in a direction at right angles to the longitudinal axis of said pipe.

20. Apparatus according to claim 14, further comprising pipe back-up means positionable at the opposite side of said pipe as the die operating position for applying back-up forces for the nut anchoring operation.

21. Apparatus according to claim 20, wherein said back-up means is another die in facing relationship to said first-mentioned die.

22. Apparatus according to claim 21, wherein said inclined lateral surface portions of the wedge member include dove-tail slots for guiding movement of said nut holder blocks.

23. A method of attaching a nut to a wall of a pipe; said method comprising:

positioning a die with swaging blade means in facing relationship to an outside surface portion of a wall of a pipe, moving a nut inside of said pipe to a position in facing relationship to said die, and pressing said nut in an outward direction transverse to the surface of said wall with sufficient pressure so that said nut punches its own installation aperture in said wall with said die providing a backing force for said nut and with said swaging blade means effecting a swaging of material of said wall around said aperture into grooves provided on said nut for anchoring said nut in said wall.

24. A method according to claim 23, further comprising placing said pipe on a worktable prior to said positioning of said die and positioning said die on the opposite side of said pipe as said worktable so as to clamp said pipe between said die and worktable.

25. A method according to claim 23, wherein said step of moving said nut includes placing said nut on an inserter and inserting said inserter through an open end of said pipe.

26. A method according to claim 23, including simultaneously positioning a second die and moving a second nut so that said pressing effects a simultaneous anchoring of two nuts into the wall of said pipe.

27. A method according to claim 25, further including removing said inserter from said pipe after said pressing step.

28. A method according to claim 25, wherein said step of pressing includes supplying compressed air to a piston-cylinder arrangement attached to a wedge member extending longitudinally in said inserter.

29. A method according to claim 25, wherein said step of pressing includes supplying hydraulic fluid to at least one piston-cylinder arrangement extending transversely of said inserter and parallel to the direction of travel of said nut during said pressing step.

30. A method according to claim 24, wherein said step of moving said nut includes placing said nut on an inserter and inserting said inserter through an open end of said pipe and wherein said step of pressing includes supplying compressed air to a piston-cylinder arrangement attached to a wedge member extending longitudinally in said inserter.

31. A method according to claim 30, wherein said step of positioning a die includes supplying hydraulic pressure fluid to a piston-cylinder arrangement connected to said die.

* * * * *